United States Patent
Ma et al.

(10) Patent No.: US 11,585,659 B2
(45) Date of Patent: Feb. 21, 2023

(54) MEMS WAVE GYROSCOPE

(71) Applicant: AAC Kaitai Technologies (Wuhan) CO., LTD, Hubei (CN)

(72) Inventors: Zhao Ma, Shenzhen (CN); Zhan Zhan, Shenzhen (CN); Shan Yang, Shenzhen (CN); Xiao Kan, Shenzhen (CN); Yang Li, Shenzhen (CN); Veronica Tan, Singapore (SG); Yan Hong, Shenzhen (CN); Kahkeen Lai, Singapore (SG)

(73) Assignee: AAC KAITAI TECHNOLOGIES (WUHAN) CO., LTD, Wuhan (CN)

( * ) Notice: Subject to any disclaimer, the term of this patent is extended or adjusted under 35 U.S.C. 154(b) by 0 days.

(21) Appl. No.: 17/566,727

(22) Filed: Dec. 31, 2021

(65) Prior Publication Data
US 2022/0373331 A1    Nov. 24, 2022

(30) Foreign Application Priority Data
May 19, 2021    (CN) .......................... 202110547836.3

(51) Int. Cl.
*G01C 19/5712* (2012.01)
(52) U.S. Cl.
CPC ................................ *G01C 19/5712* (2013.01)
(58) Field of Classification Search
CPC ................................................. G01C 19/5712
See application file for complete search history.

(56) References Cited

U.S. PATENT DOCUMENTS

| | | | | |
|---|---|---|---|---|
| 5,955,668 A * | 9/1999 | Hsu | ..................... | G01C 19/5719 73/1.37 |
| 6,889,550 B2 * | 5/2005 | Beitia | ................ | G01C 19/5684 73/504.04 |
| 6,894,576 B2 * | 5/2005 | Giousouf | ................. | H03B 5/30 73/504.04 |
| 7,325,451 B2 * | 2/2008 | Blomqvist | ......... | G01C 19/5712 73/504.04 |
| 7,360,423 B2 * | 4/2008 | Ayazi | ................. | G01C 19/5677 73/504.12 |
| 9,134,128 B2 * | 9/2015 | Rocchi | ............... | G01C 19/5747 |
| 2010/0307244 A1 * | 12/2010 | Rocchi | ................ | G01P 15/0802 73/504.12 |
| 2013/0000404 A1 * | 1/2013 | Katsumata | ......... | G01C 19/5712 73/504.12 |
| 2013/0174661 A1 * | 7/2013 | Kuhlmann | ......... | G01C 19/5712 73/504.12 |

(Continued)

*Primary Examiner* — David J Bolduc
(74) *Attorney, Agent, or Firm* — W&G Law Group

(57) ABSTRACT

The present invention is to provide a MEMS wave gyroscope with improved sensitivity. The MEMS wave gyroscope includes a base; an anchor structure fixed to the base; and a volatility structure suspended above the base. The volatility structure includes N horizontal beams and M straight beams for being interlaced to form M nodes. The horizontal beam is divided into M−1 first beam units by the nodes. The straight beam is divided into N−1 second beam units by the nodes. A first in-surface transducer is formed by the second beam unit coupled with a mechanical field and an electric field of the second beam unit on two opposite sides along the second axis. A first out-surface transducer is formed by at least one of two opposite sides of the second beam coupled with the mechanical field and electric field of the second beam unit.

10 Claims, 14 Drawing Sheets

(56) References Cited

U.S. PATENT DOCUMENTS

| | | | | |
|---|---|---|---|---|
| 2015/0068308 A1* | 3/2015 | Blomqvist | ............ | B81B 7/0058 |
| | | | | 73/504.12 |
| 2015/0115377 A1* | 4/2015 | DeNatale | ........... | G01C 19/5712 |
| | | | | 438/51 |
| 2015/0308828 A1* | 10/2015 | Jomori | ................. | G01C 19/574 |
| | | | | 73/504.12 |
| 2019/0049248 A1* | 2/2019 | Reinmuth | ............. | B81B 3/0072 |
| 2020/0200535 A1* | 6/2020 | Kuisma | .............. | G01C 19/5712 |
| 2020/0309563 A1* | 10/2020 | Lipka | ................. | G01C 19/5698 |

\* cited by examiner

MEMS WAVE GYROSCOPE

FIELD OF THE PRESENT DISCLOSURE

The present invention relates to the technical field of gyroscopes, and more particularly to a MEMS wave gyroscope.

DESCRIPTION OF RELATED ART

Micro-mechanical gyroscope, namely MEMS (Micro Electro Mechanical systems) gyroscope, is a typical miniature angular velocity micro sensor. Because of its small size, low power consumption and convenient processing, it has a very wide range of applications in the consumer electronics market. In recent years, with the gradual improvement of the performance of the gyroscope, it is widely used in the fields of automobile, industry, virtual reality and so on.

The MEMS out-of-plane swing gyroscope is a typical representative of the MEMS out-of-plane detection gyroscope. As shown in FIGS. 1-3, the driving mode of the MEMS out-of-plane swing gyroscope in the related art swings around the axis of the anchor point 100. When the angular velocity Ω is applied, due to the Coriolis effect, the gyroscope transfers energy to the detection mode, causing the mass structure 200 to swing out of the plane while being relatively driven. The magnitude of Ω can be obtained by detecting the displacement of the out-of-plane swing. However, the detection capacitance and sensitivity of this MEMS out-of-plane swing gyroscope are small.

SUMMARY OF THE PRESENT INVENTION

One of the main objects of the present invention is to provide a MEMS wave gyroscope with improved sensitivity.

To achieve the above-mentioned objects, the present invention provides a MEMS wave gyroscope, including: a base; an anchor structure fixed to the base; and a volatility structure suspended above the base. The volatility structure includes N horizontal beams arranged at intervals along a first axis and M straight beams arranged at intervals along a second axis for being interlaced to form M nodes. The horizontal beam is divided into M−1 first beam units by the nodes. The straight beams and the N horizontal beams are interlaced to form N nodes. The straight beam is divided into N−1 second beam units by the nodes; the nodes located on an outer contour of the volatility structure are mechanically coupled with the anchor structure. A first in-surface transducer is formed by the second beam unit coupled with a mechanical field and an electric field of the second beam unit on two opposite sides along the second axis; wherein the first in-surface transducer is fixed to the base and spaced from the second beam unit.

A first out-surface transducer is formed by at least one of two opposite sides of the second beam unit along a third axis coupled with the mechanical field and electric field of the second beam unit; the first out-surface transducer is fixed to the base and spaced from the second beam unit.

N and M are positive integers not less than 2; the first axis, the second axis and the third axis are perpendicular to each other; the MEMS wave gyroscope has a driving mode and a detection model the driving mode includes an in-plane wave mode in a plane of the volatility structure and an out-of-plane wave mode in the plane of the volatility structure; and the detection modality includes a first axis detection modality with the first axis as a detection axis.

In Addition, in the driving mode, the first beam unit and the second beam unit work in a second-order mode, and the M−1 first beam units move in the same phase or anti-phase; the N−1 second beam units move in the same phase or anti-phase; in the first axis detection mode, the second beam unit works in a second-order mode; and the N−1 second beam units move in the same phase or in anti-phase.

In addition, the second beam unit is fixedly provided with a first weight along two opposite sides of the second axis, and the first weight and the first in-surface transducer are arranged at intervals.

In addition, the detection mode further includes a second axis detection mode with the second axis as the detection axis, and the MEMS wave gyroscope further includes:

a second in-surface transducer provided by the first beam unit coupled with a mechanical field and an electric field of the first beam unit along both sides of the first axis; wherein the second in-surface transducer is fixed to the base and spaced from the first beam unit;

a second out-surface transducer provided by at least one of two opposite sides of the first beam unit along the third axis coupled with the mechanical field and electric field of the first beam unit; wherein the second out-surface transducer is fixed to the base and spaced from the first beam unit.

In addition, in the second axis detection mode, the first beam unit works in a second-order mode, and the M−1 first beam units move in the same phase or anti-phase.

In addition, the first beam unit is respectively fixedly provided with a second weight along two opposite sides of the first axis; and the second weight and the second in-surface transducer are set at intervals.

In addition, the first beam unit and the second beam unit have a same length.

In addition, a length of the first beam unit is not equal to a length of the second beam unit.

In addition, the anchor structure locates on a periphery of the volatility structure; a coupling beam is connected between the node located on the outer contour of the volatility structure and the anchor structure.

In addition, the anchor structure includes multiple anchor points; one end of the coupling beam is connected to the anchor point, and the other end is connected to the node located on the outer contour of the volatility structure.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

15 is a schematic view of the MEMS wave gyroscope of embodiment IV provided by the present invention.

DETAILED DESCRIPTION OF THE EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

It should be noted that all directional indicators (such as up, down, left, right, front, back, inside, outside, top, bottom . . . ) in the embodiment of the present invention are only used to explain that in a specific posture (as shown in the accompanying drawings) Shown below) the relative positional relationship between the components. If the specific posture changes, the directional indication changes accordingly.

Embodiment I

Figure 1:
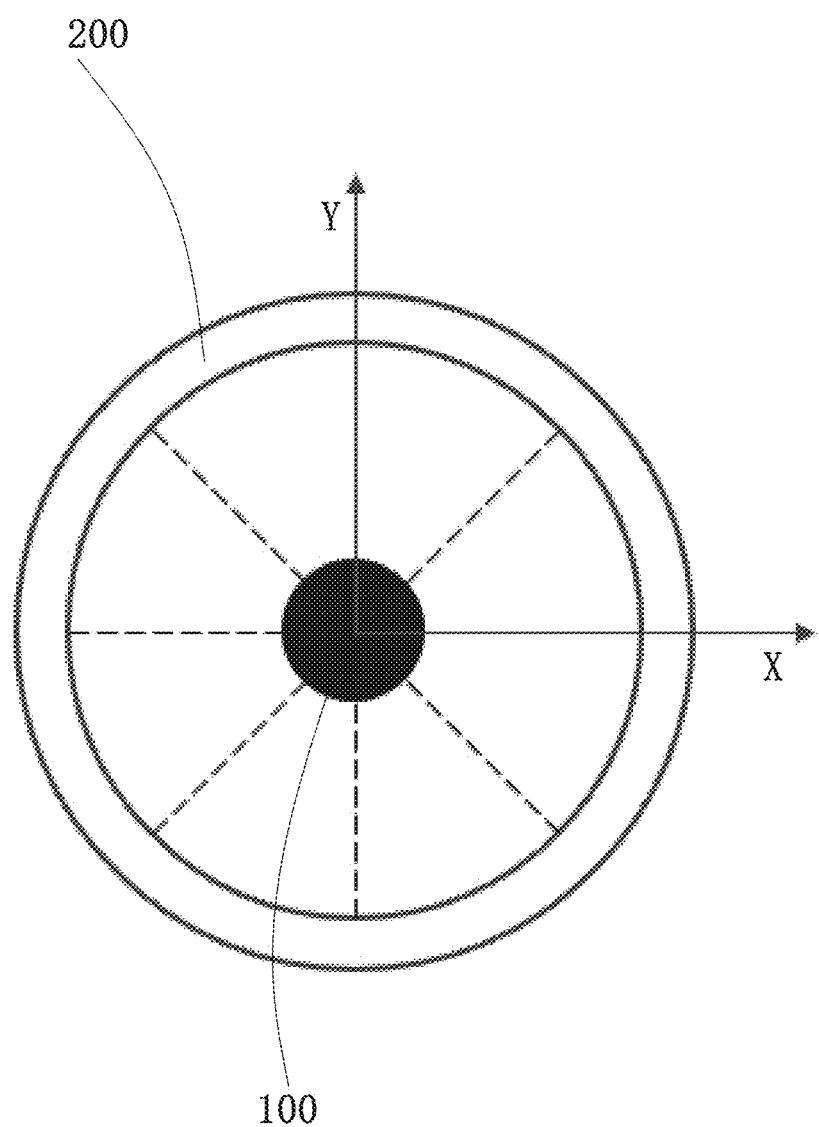
FIG. 1 is a schematic structural view of a typical MEMS out-of-plane swing gyroscope provided by related technologies.
Figure 2:
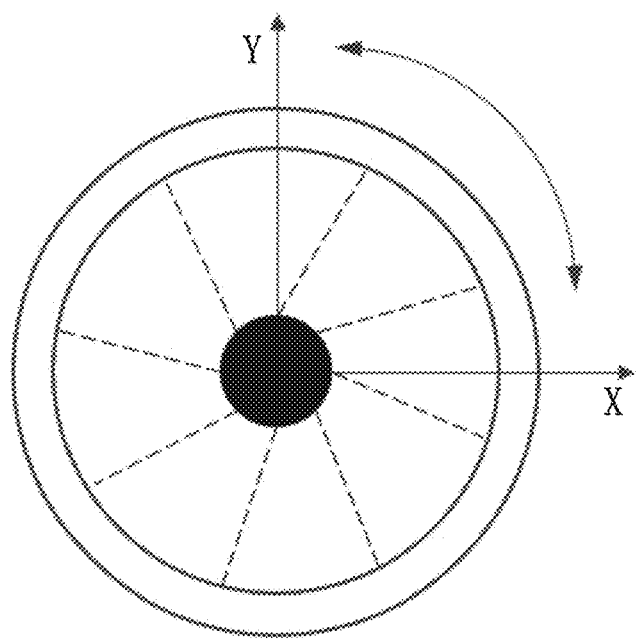
FIG. 2 is a schematic view of the driving mode of the MEMS out-of-plane swing gyroscope shown in FIG. 1.
Figure 3:
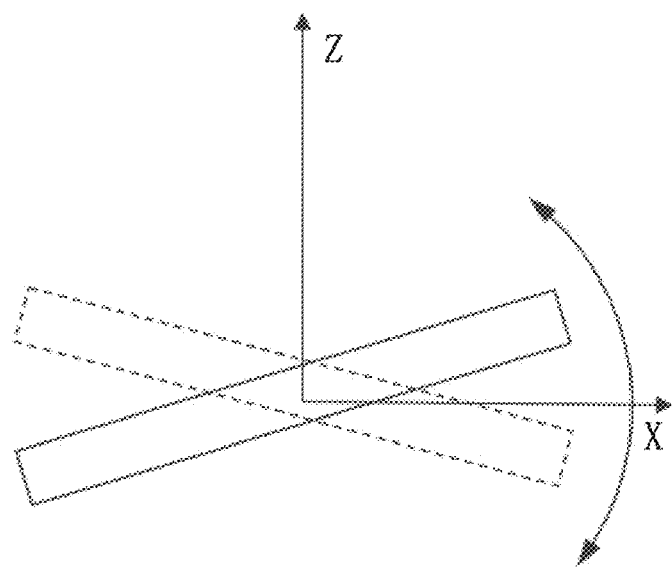
FIG. 3 is a schematic view of the detection mode of the MEMS out-of-plane swing gyroscope shown in FIG. 1.
Figure 4:
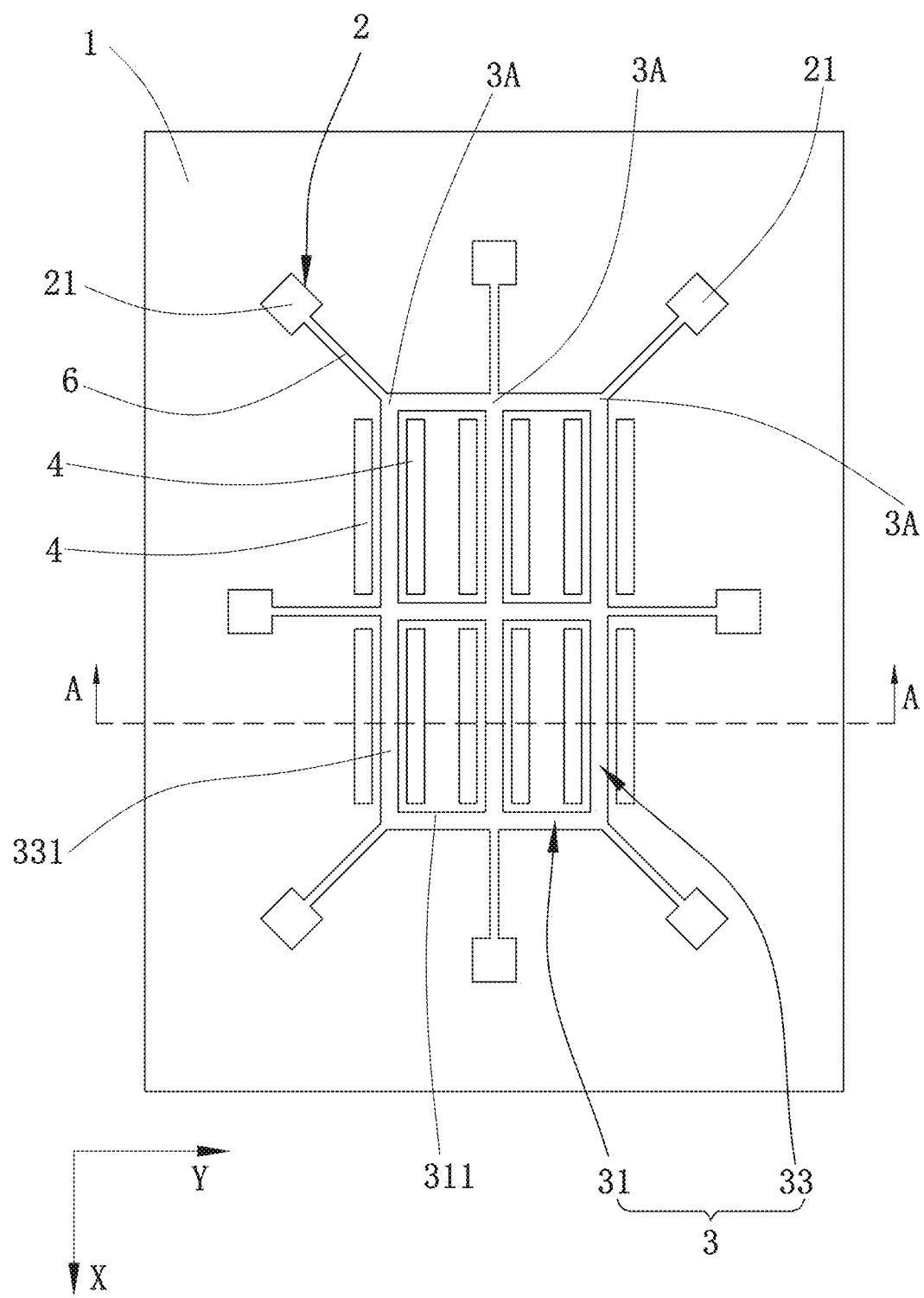
FIG. 4 is a schematic structural view of a MEMS wave gyroscope of embodiment 1 provided by the present invention.
Figure 5:
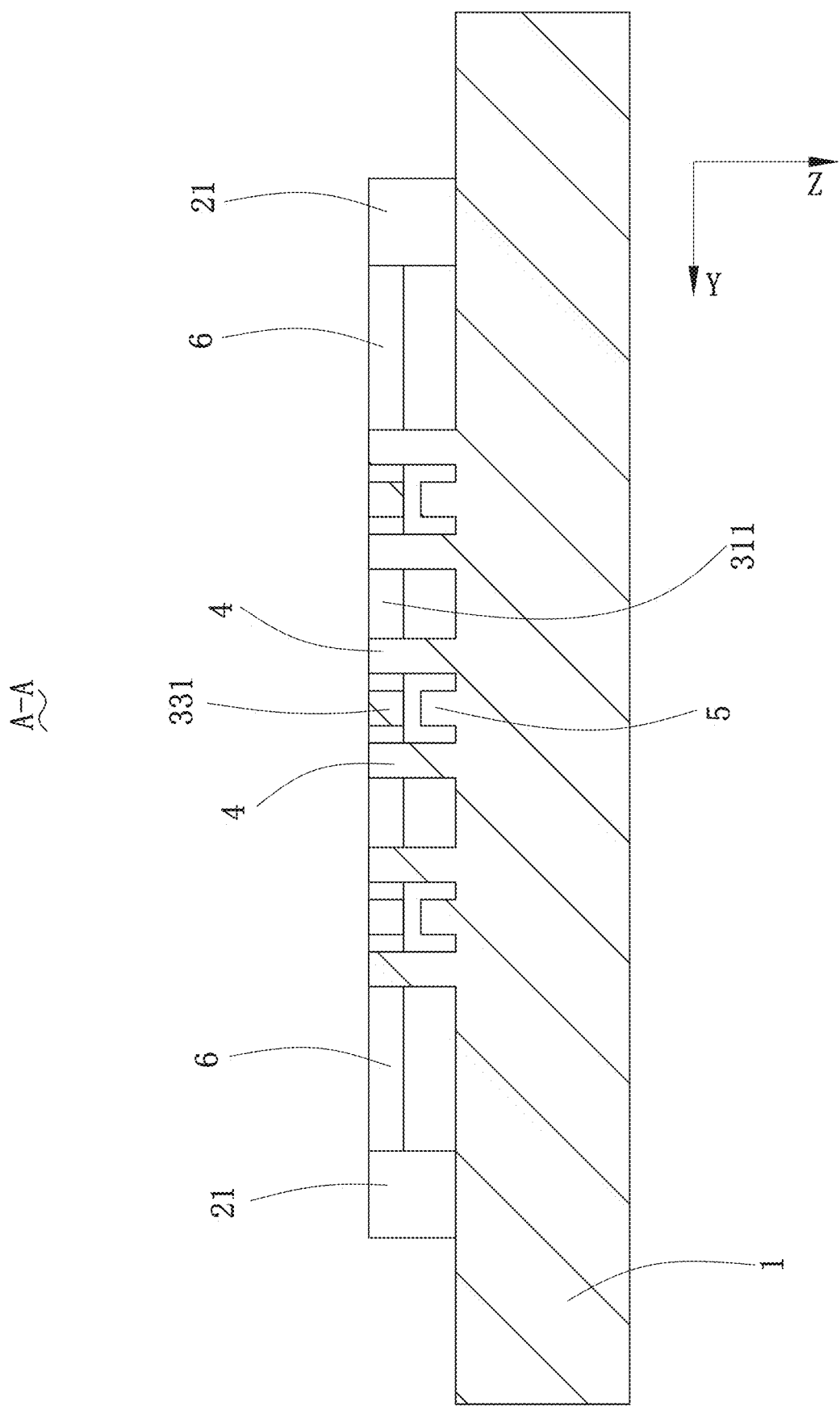
FIG. 5 is a cross-sectional view of the MEMS wave gyroscope shown in FIG. 4 taken along the AA direction.

Referring to FIGS. 4 and 5, the present invention provides an MEMS wave gyroscope. the MEMS wave gyroscope includes a base 1, an anchor structure 2, a volatility structure 3, a first in-surface transducer 4, and a first out-surface transducer 5. Wherein, the first in-surface transducer 4 is used to realize the coupling of the mechanical field (including mechanical force and mechanical displacement) and electric field in the MEMS wave gyroscope plane. The first out-surface transducer 5 is used to realize the coupling of the mechanical field (including mechanical force, mechanical displacement) and electric field outside the MEMS wave gyroscope plane. Volatility structure 3 is the vibration part of the entire MEMS wave gyroscope. Volatility structure 3 generates vibration under the action of mechanical field and electric field in and out of the MEMS wave gyroscope plane.

The base 1 has a cubic structure, but of course it can also have a cylindrical structure.

The anchor structure 2 is fixed to the base 1.

The outer contour of volatility structure 3 is rectangular and suspended on base 1. The volatility structure 3 includes N horizontal beams 31 arranged at intervals along the first axis X and M straight beams 33 arranged at intervals along the second axis Y. The horizontal beam 31 and the M straight beam 33 are staggered to form M node 3A. And the horizontal beam 31 is divided into M−1 first beam units 311 by the node 3A on it. The straight beam 33 and the N horizontal beams 31 are interlaced to form N node 3A, and the straight beam 33 is divided into N−1 second beam units 331 by the node 3A above it. The node 3A located on the outer contour of the volatility structure 3 is mechanically coupled with the anchor structure 2 to suspend the volatility structure 3 on the base 1. Wherein, N and M are positive integers not less than 2 respectively. The first axis X and the second axis Y are perpendicular to each other. The number of the node 3A on the outer contour of the volatility structure 3 is 2(M+N)−4.

In this embodiment, the lengths of the first beam unit 311 and the second beam unit 331 are not equal.

As shown in FIG. 4, both M and N are 3, then the horizontal beam 31 is divided into two first beam units 311 by the node 3A above it. The straight beam 33 is divided into two second beam units 331 by the node 3A on it. The number of node 3A on the outer contour of volatility structure 3 is 8.

The first in-surface transducer 4 is used to realize the coupling of the mechanical field (including mechanical force, mechanical displacement) and electric field in the MEMS wave gyroscope plane. Specifically, two opposite sides of the second beam unit 331 along the second axis Y are respectively provided with a first in-surface transducer 4 coupled with the mechanical field and the electric field of the second beam unit 331. The first in-surface transducer 4 is fixed at base 1 and is arranged apart from the second beam unit 331. Wherein, the energy conversion form of the first in-surface transducer 4 includes one or more combinations of capacitance, inductance, pyroelectric, and piezoelectric. In turn, the first in-surface transducer 1 can realize a variety of transduction forms to realize the transduction function.

The first out-surface transducer 5 is used to realize the coupling of the mechanical field (including mechanical force, mechanical displacement) and electric field outside the plane of the MEMS wave gyroscope. Specifically, as shown in FIG. 5, the side of the second beam unit 331 facing the base 1 (that is, only one of the two opposite sides of the second beam unit 331 along the third axis Z) is provided with a first out-surface transducer 5 coupled with the second beam unit 331 mechanical field (including mechanical force and mechanical displacement) and electric field. The first out-surface transducer 5 is fixed at base 1 and is arranged at intervals from the second beam unit 331. Wherein, the third axis Z is perpendicular to both the first axis X and the second axis Y. The energy conversion form of the first out-surface transducer 4 includes one or more combinations of capacitance, inductance, pyroelectric, and piezoelectric. In turn, the first in-surface transducer 1 can realize a variety of transduction forms to realize the transduction function.

It can be understood that the first out-surface transducer 5 is not limited to the side of the second beam unit 331 facing the base 1. For example, in other embodiments, the first out-surface transducer may also be set on the side of the second beam unit 331 away from base 1. Alternatively, the second beam unit is provided with first out-surface transducers on two opposite sides along the third axis Z, respectively. In other words, at least one of the two opposite sides of the second beam unit 331 along the third axis Z is provided with a first out-surface transducer 5 coupled with the mechanical field and electric field of the second beam unit 331.

It should be noted that when the second beam unit 331 is provided with a first out-surface transducer on the side away from base 1, the base needs to be set two. And the volatility structure is located between the two bases.

As shown in FIG. 4, the anchor structure 2 is arranged on the periphery of the volatility structure 3, and the coupling beam 6 is connected between the node 3A on the outer contour of the volatility structure 3 and the anchor structure 2. That is, node 3A and anchor structure 2 are mechanically coupled through coupling beam 6.

As shown in FIG. 4, the anchor structure 2 includes a plurality of anchor points 21, one end of the coupling beam 6 is connected to the anchor point 21, and the other end is connected to the node 3A on the outer contour of the volatility structure 3.

The MEMS wave gyroscope of embodiment 1 can work in the driving mode and the detection mode. the driving mode includes the in-plane wave mode in the plane of the volatility structure 3 and the out-of-plane wave mode in the plane of the volatility structure 3. The detection mode includes a first axis detection mode with the first axis X as the detection axis.

Figure 6:
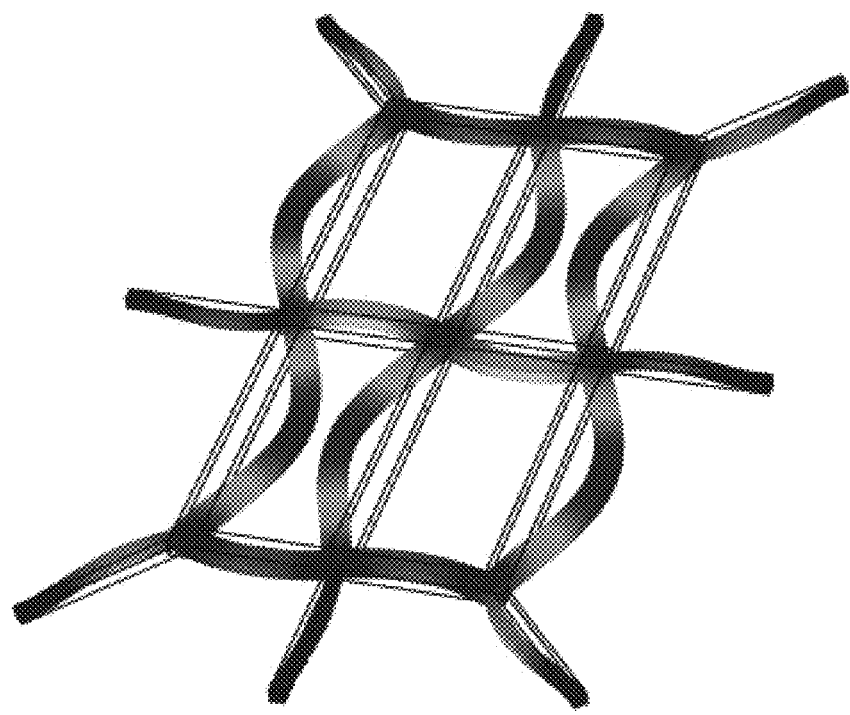
FIG. 6 is a schematic view of the MEMS out-of-plane swing gyroscope shown in FIG. 4 in a driving mode.
Figure 6:
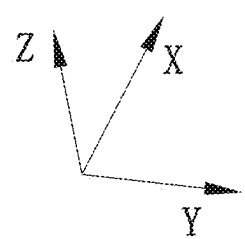
Figure 7:
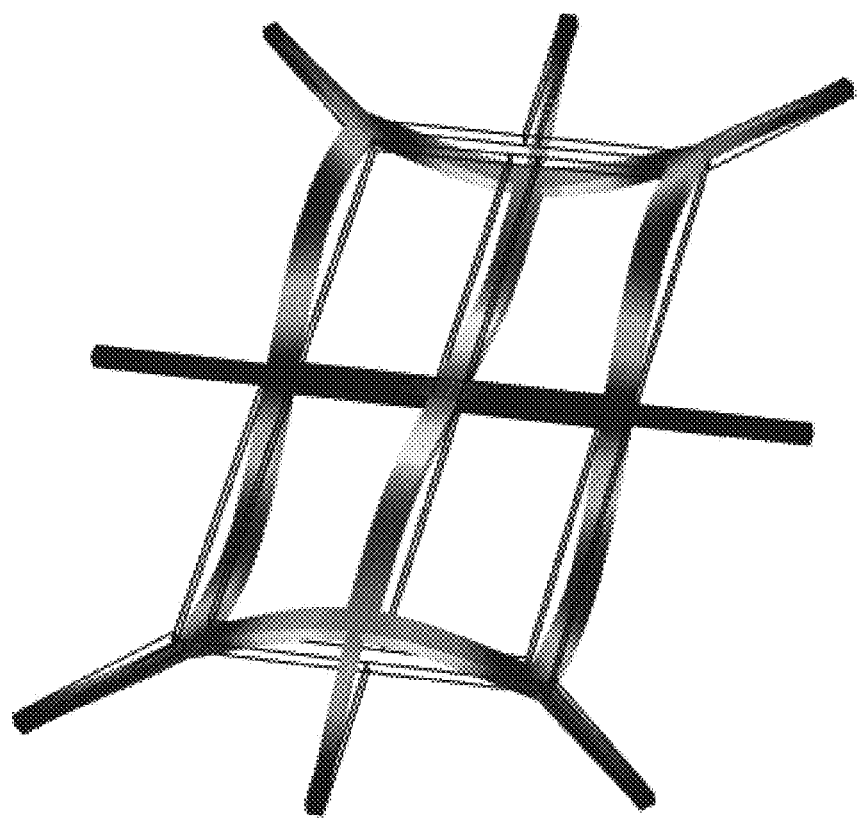
FIG. 7 is a schematic view of the first axis detection mode vibration of the MEMS out-of-plane swing gyroscope shown in FIG. 6.
Figure 7:
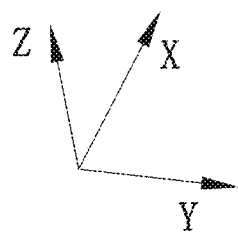

As shown in FIGS. 6-7, the volatility structure 3 is driven by external driving force to drive the vibration of the modal mode. Wherein, in the driving mode, the first beam unit 311 and the second beam unit 331 work in the second-order mode, and the M−1 first beam units 311 move in the same phase or anti-phase. The N−1 second beam units 331 move in the same phase or in anti-phase. At this time, when the MEMS wave gyroscope is subjected to the first axis X angular velocity ω, according to the Coriolis principle, the angular velocity ω will produce the resultant Coriolis force along the third axis Z direction. The combined force of the Coriolis forces will force the MEMS wave gyroscope to be subjected to the vibration of the first axis detection mode with the first axis X as the detection axis. Wherein, in the first axis detection mode, the second beam unit 331 works in the second-order mode. And the N−1 second beam units 331 move in the same phase or anti-phase. By detecting the vibration displacement of the third axis of the MEMS wave gyroscope in the Z direction, the angular velocity ω can be obtained. Wherein, the first in-surface transducer 4 and second beam unit 331 mechanical field and electric field coupling and the first out-surface transducer 5 and second beam unit 331 mechanical field (including mechanical force, mechanical displacement) and electric field coupling effect: Generate the external driving force required to force the MEMS wave gyroscope to drive the vibration of the modal vibration. Detect the vibration displacement of the MEMS wave gyroscope along the vibration direction of the detection mode. Suppress the quadrature error of the MEMS wave gyroscope.

Embodiment II

Figure 8:
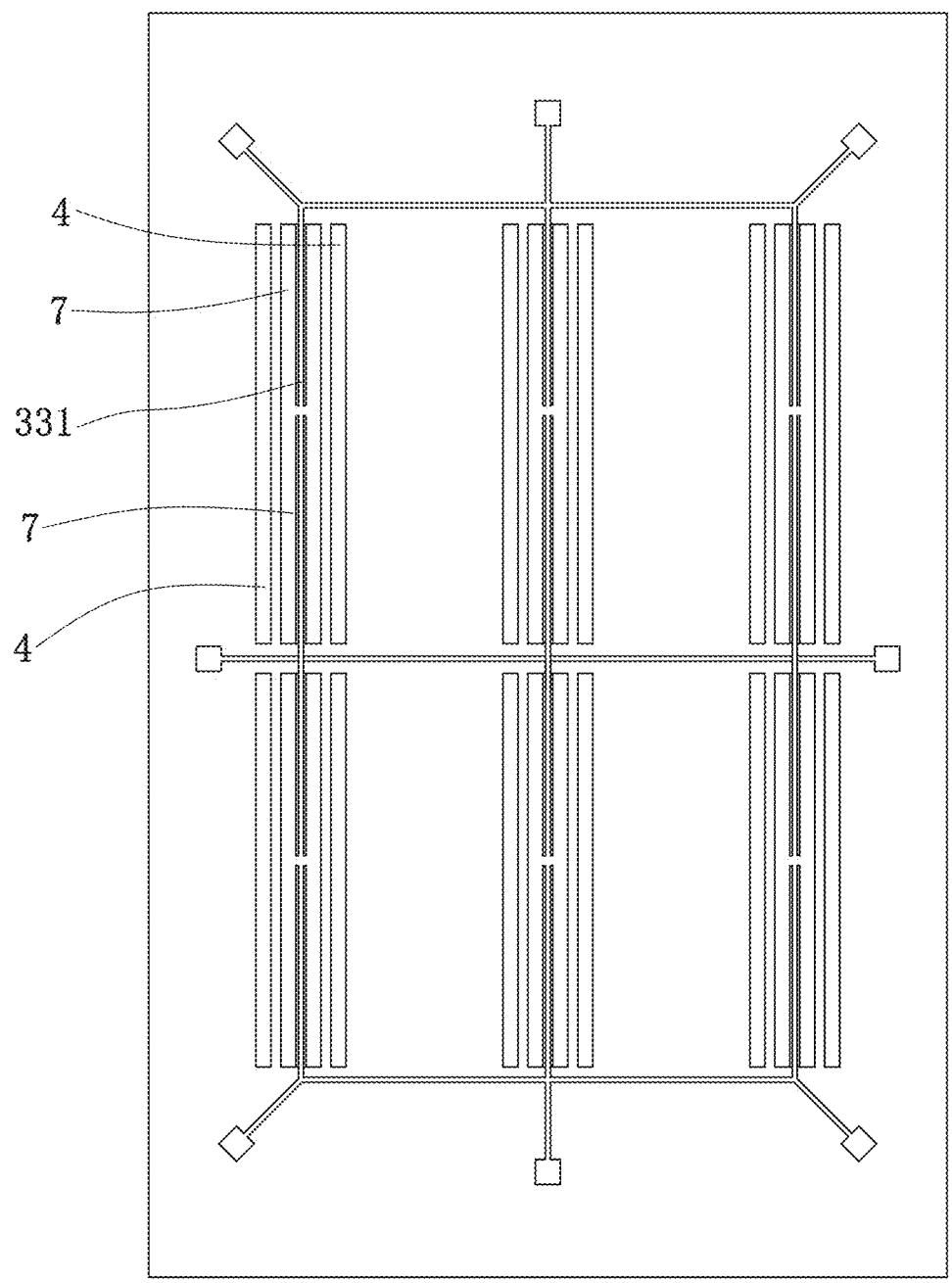
FIG. 8 is a schematic view of a MEMS wave gyroscope of embodiment II provided by the present invention.

Please refer to FIG. 8. The difference between embodiment 2 and embodiment 1 is only: The second beam unit 331 is fixedly provided with a first weight 7 on two opposite sides along the second axis Y, and the first weight 7 and the first in-surface transducer 4 are arranged at intervals.

Embodiment III

Figure 9:
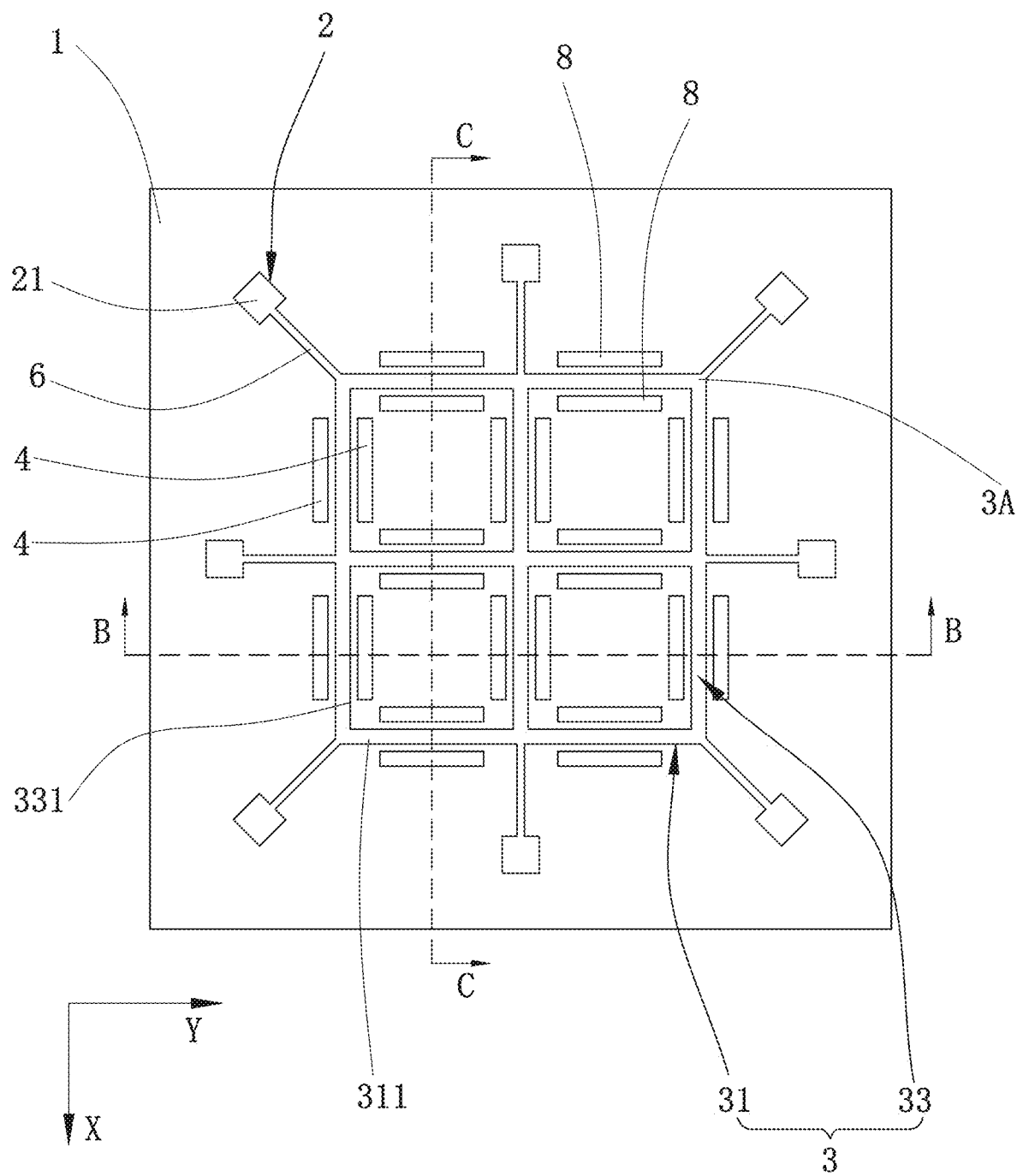
FIG. 9 is a schematic view of a MEMS wave gyroscope of embodiment III provided by the present invention.
Figure 10:
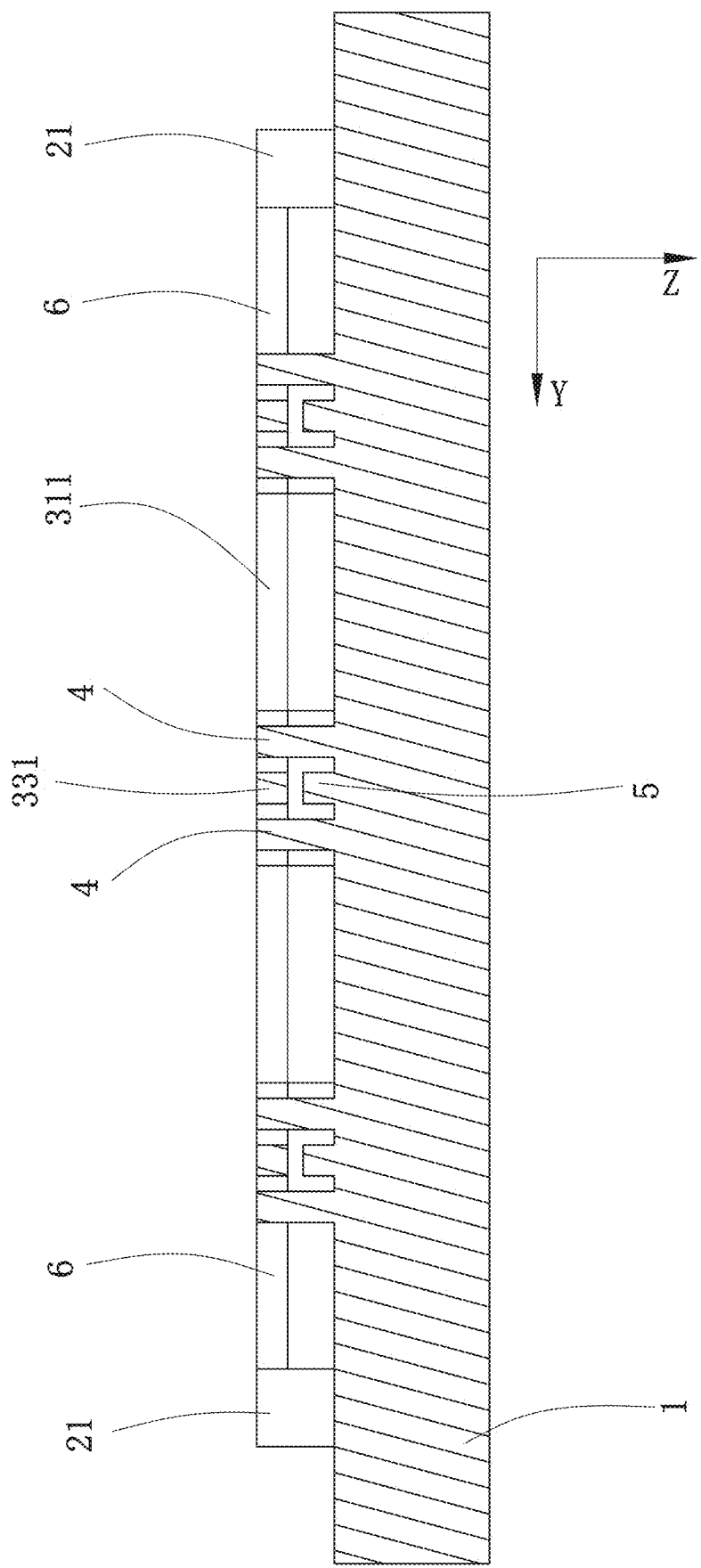
FIG. 10 is a cross-sectional view of the MEMS wave gyroscope shown in FIG. 9 taken along the BB direction.
Figure 11:
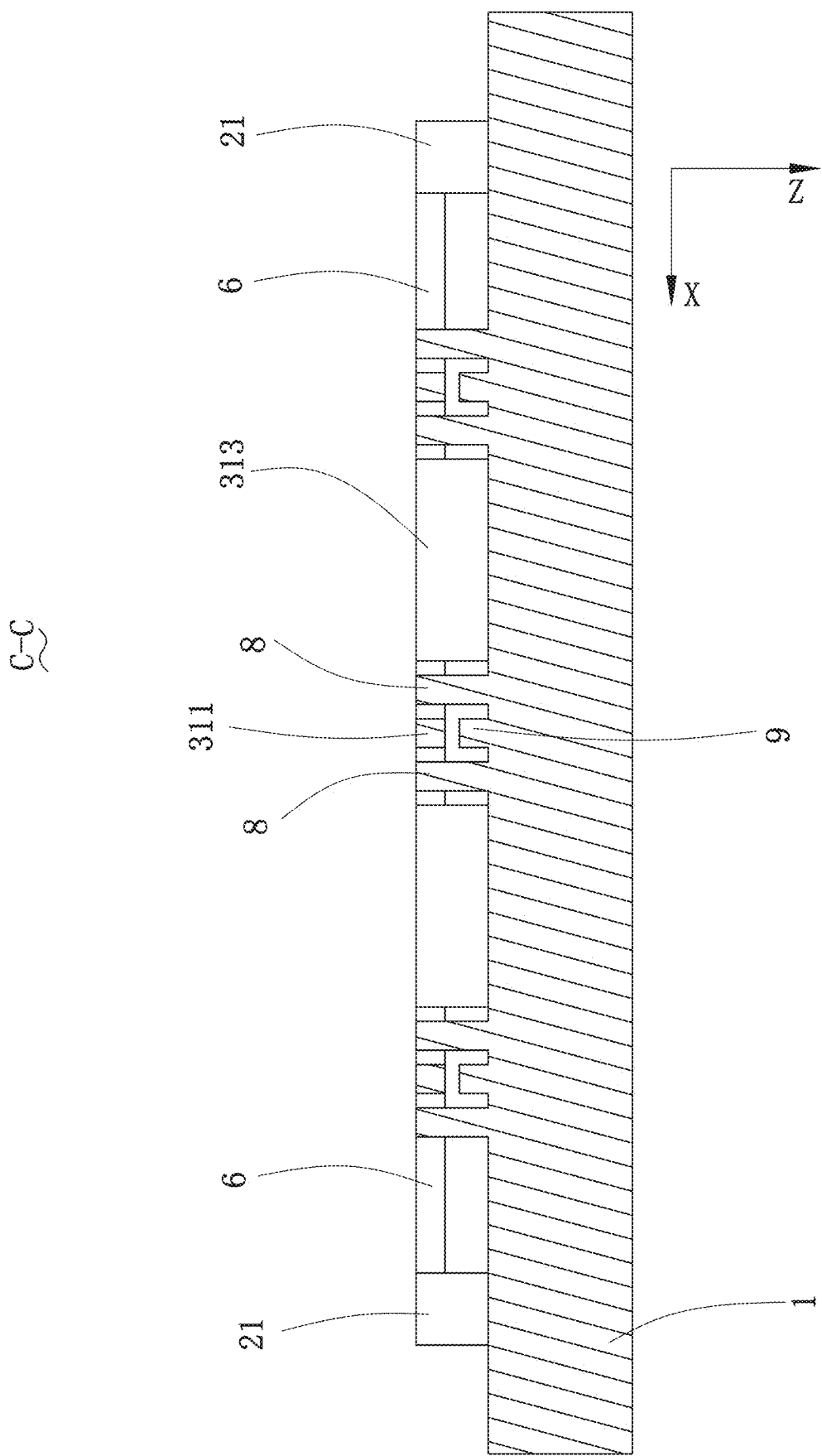
FIG. 11 is a cross-sectional view of the MEMS wave gyroscope shown in FIG. 9 taken along the CC direction.

Please refer to FIGS. 9-11. the difference between embodiment 3 and embodiment 1 is only: The MEMS wave gyroscope also includes a second in-surface transducer 8 and a second out-surface transducer 9. Wherein, the second in-surface transducer 8 is used to realize the coupling of the mechanical field (including mechanical force, mechanical displacement) and electric field in the MEMS wave gyroscope plane. The second out-surface transducer 9 is used to realize the coupling of the mechanical field (including mechanical force, mechanical displacement) and electric field outside the MEMS wave gyroscope plane.

The first beam unit 311 is respectively provided with a second in-surface transducer 8 coupled with the mechanical field and electric field of the first beam unit 311 along the two sides of the first axis X. The second in-surface transducer 8 is fixed to base 1 and is arranged at intervals from the first beam unit 311. Wherein, the energy conversion form of the second in-surface transducer 8 includes one or more combinations of capacitance, inductance, pyroelectric, and piezoelectric. In turn, the second in-surface transducer 8 can realize a variety of transduction forms to realize the transduction function.

The side of the first beam unit 311 facing the base 1 (that is, only one of the two opposite sides of the first beam unit 311 along the third axis Z) is provided with a second out-surface transducer 9 coupled with the mechanical field and electric field of the first beam unit 311. The second out-surface transducer 9 is fixed to base 1 and is arranged at intervals from the first beam unit 311. Wherein, the energy conversion form of the second out-surface transducer 9 includes one or more combinations of capacitance, inductance, pyroelectric, and piezoelectric. In turn, the second out-surface transducer 9 can realize a variety of transduction forms to realize the transduction function.

It can be understood that the second out-surface transducer 9 is not limited to the side of the first beam unit 311 facing the base 1. For example, in other embodiments, the second out-surface transducer can also be set on the side of the first beam unit away from the base. Alternatively, the first beam unit is provided with a second out-surface transducer on two opposite sides along the third axis Z. In other words, at least one of the two opposite sides of the first beam unit 311 along the third axis Z is provided with a second out-surface transducer 9 coupled with the mechanical field and electric field of the first beam unit 311.

In this embodiment, the first beam unit 311 and the second beam unit 331 have the same length.

The MEMS wave gyroscope of embodiment 3 can work in the driving mode and the detection mode. The driving modes include in-plane wave modes in the plane of volatility structure 3 and out-of-plane wave modes in the plane of volatility structure 3. The detection mode includes a first axis detection mode with the first axis X as the detection axis and the second axis detection mode with the second axis Y as the detection axis.

Figure 12:
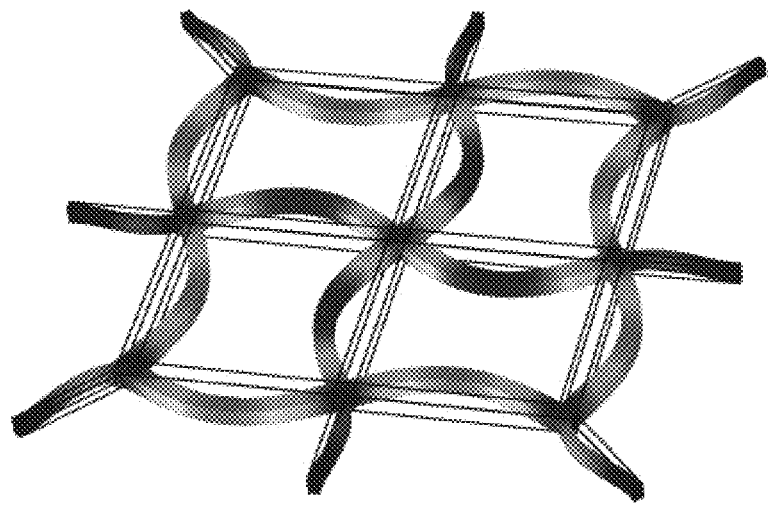
FIG. 12 is a schematic view of the MEMS out-of-plane swing gyroscope shown in FIG. 9 in a driving mode.
Figure 12:
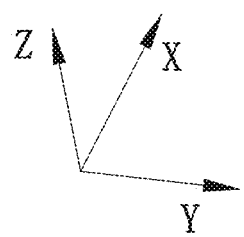
Figure 13:
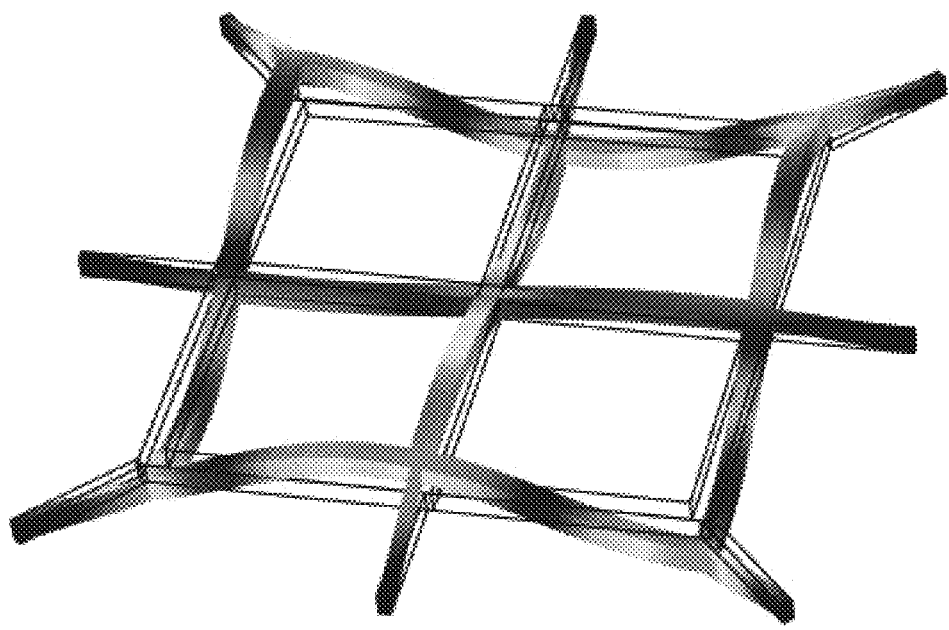
FIG. 13 is a schematic view of the first axis detection mode vibration of the MEMS out-of-plane swing gyroscope shown in FIG. 12.
Figure 13:
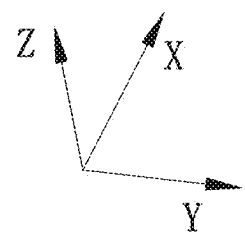

As shown in FIGS. 12-13, the volatility structure 3 is driven by external driving force to drive the modal vibration. Wherein, in the driving mode, the first beam unit 311 and the second beam unit 331 work in the second-order mode. In addition, the M−1 first beam units 311 move in the same phase or anti-phase, and the N−1 second beam units 331 move in the same phase or anti-phase. At this time, when the MEMS wave gyroscope is subjected to the first axis X angular velocity ω, according to the Coriolis principle, the angular velocity ω will produce the resultant Coriolis force along the third axis Z direction. The combined force of the Coriolis forces will force the MEMS wave gyroscope to be subjected to the vibration of the first axis detection mode with the first axis X as the detection axis. Wherein, in the first axis detection mode, the second beam unit 331 works in the second-order mode. And the N−1 second beam units 331 move in the same phase or anti-phase. By detecting the vibration displacement of the third axis of the MEMS wave gyroscope in the Z direction, the angular velocity ω can be obtained. Wherein, the first in-surface transducer 4 is coupled with the second beam unit 331 mechanical field and electric field, the first out-surface transducer 5 and second beam unit 331 mechanical field (including mechanical force, mechanical displacement) and electric field coupling, the second in-surface transducer 8 is coupled with the first beam unit 311 mechanical field and electric field, and the second out-surface transducer 9 and first beam unit 311 mechanical field (including mechanical force, mechanical displacement) and electric field coupling: Under this action, the external driving force required to force the MEMS wave gyroscope to drive the vibration of the modal vibration is generated. Detect the vibration displacement of the MEMS wave gyroscope along the vibration direction of the detection mode. Suppress the quadrature error of the MEMS wave gyroscope.

Figure 14:
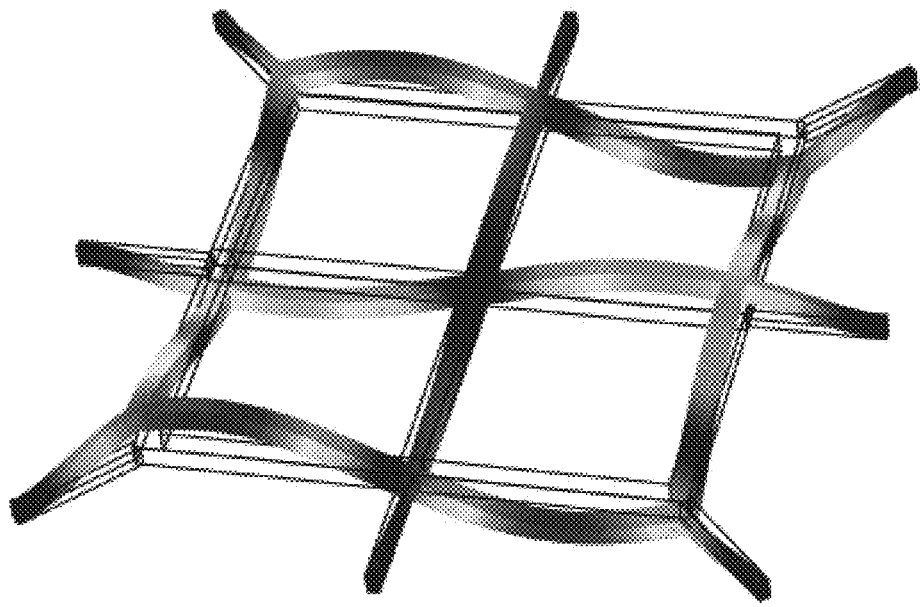
FIG. 14 is a schematic view of the vibration of the second axis detection mode shape generated by the MEMS out-of-plane swing gyroscope shown in FIG. 12.
Figure 14:
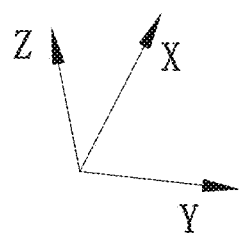

As shown in FIG. 12 and FIG. 14, the volatility structure 3 is driven by the external driving force to drive the modal vibration. Wherein, in the driving mode, the first beam unit 311 and the second beam unit 331 work in the second-order mode. In addition, the M−1 first beam units 311 move in the same phase or anti-phase, and the N−1 second beam units 331 move in the same phase or anti-phase. At this time, when the MEMS wave gyroscope is subjected to the second axis Y angular velocity ω, according to the Coriolis principle, the angular velocity ω will produce the resultant Coriolis force along the third axis Z direction. The combined force of the Coriolis force will force the MEMS wave gyroscope to be subjected to the vibration of the second axis detection mode with the second axis Y as the detection axis. Wherein, in the second axis detection mode, the first beam unit 311 works in the second-order mode. And the N−1 beam units 311 move in the same phase or in anti-phase. By detecting the vibration displacement of the third axis of the MEMS wave gyroscope in the Z direction, the angular velocity ω can be obtained.

Embodiment IV

Figure 15:
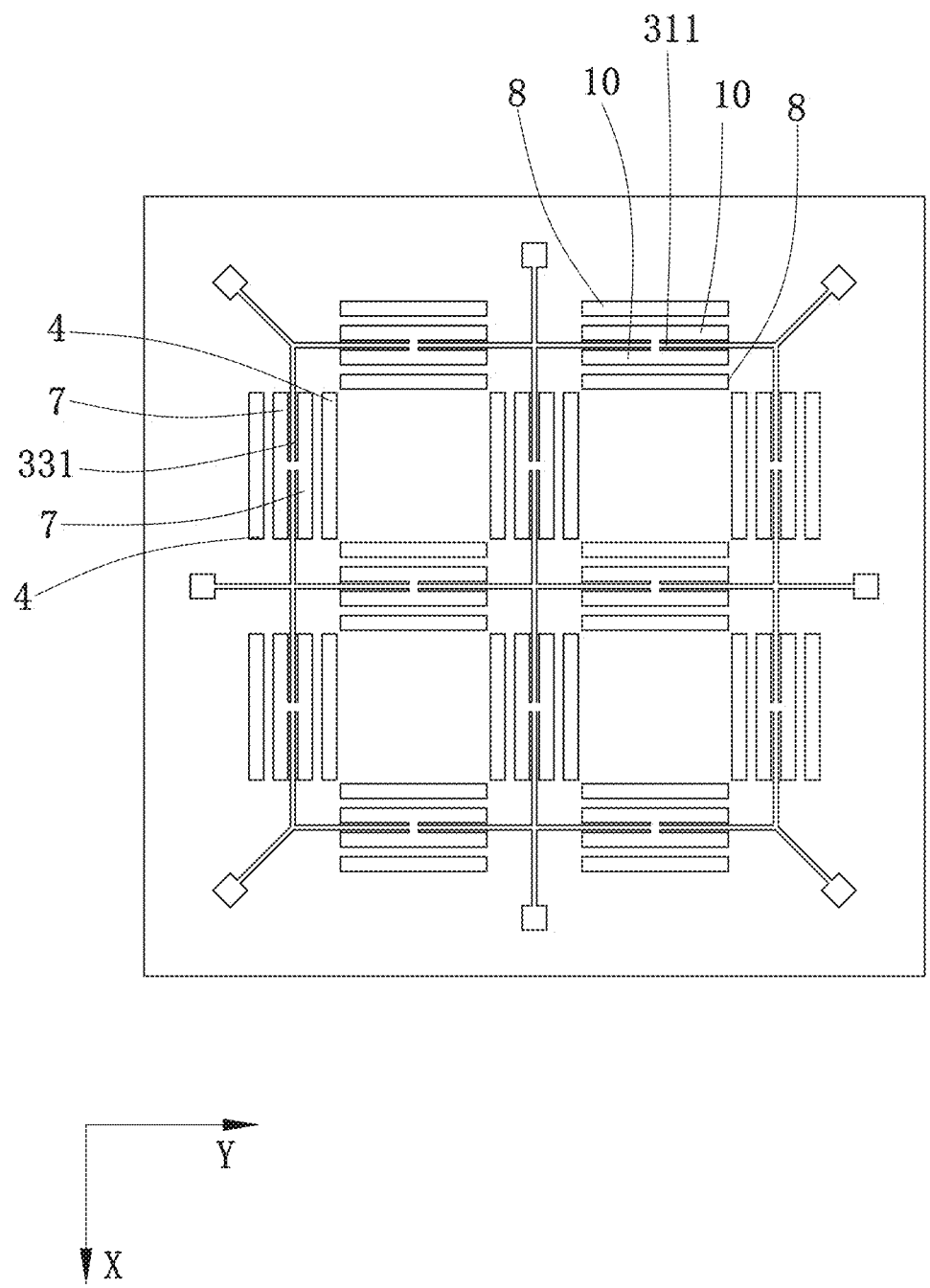

Please refer to FIG. 15. The difference between embodiment four and implementation three is only: The second beam unit 331 is fixedly provided with a first weight 7 on two opposite sides along the second axis Y, respectively. And first weight 7 and first in-surface transducer 4 are set at intervals. The first beam unit 311 is respectively fixedly provided with a second weight 10 along two opposite sides of the first axis X. And second weight 10 and second in-surface transducer 8 are set at intervals.

It should be noted that When the MEMS wave gyroscope shown in the third and fourth embodiments is used for biaxial detection (What is produced by MEMS wave gyroscope is: Vibration of the detection mode shape of the first axis with the first axis X as the detection axis; and vibration of the detection mode shape of the second axis with the second axis X as the detection axis), the first unit beam 311 and the second unit beam 331 may not be equal. Specifically, when a general gyro is actually working, there will be a certain difference in the biaxial detection frequency. At this time, the lengths of the first unit beam 311 and the second unit beam 331 may not be equal.

In the embodiments of the present invention, the MEMS wave gyroscope has the following advantages:

1. The detection mode of the gyroscope can realize anti-phase vibration, so it can realize the differential detection of the gyroscope, which can effectively immune the influence of acceleration shock and quadrature error and improve the sensitivity.

2. The driving mode of the gyroscope is differential driving, which can effectively improve the stability of the driving.

3. Both the driving and detecting modes of the gyroscope are wave modes, which are similar to multi-ring gyroscopes and have good anti-vibration characteristics.

4. The gyroscope can be configured with weight to increase the quality of the gyroscope's detection of Coriolis, thereby increasing the area utilization rate of the chip and increasing the sensitivity of the gyroscope.

5. Both gyroscope weight and surface outer transducer adopt a symmetrical layout, which is convenient for realizing differential detection.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A MEMS wave gyroscope, comprising:
a base;
an anchor structure fixed to the base;
a volatility structure suspended above the base, comprising N horizontal beams arranged at intervals along a first axis and M straight beams arranged at intervals along a second axis for being interlaced to form M nodes; wherein the horizontal beam is divided into M−1 first beam units by the nodes; the straight beams and the N horizontal beams are interlaced to form N nodes; the straight beam is divided into N−1 second beam units by the nodes; the nodes located on an outer contour of the volatility structure are mechanically coupled with the anchor structure;
a first in-surface transducer formed by the second beam unit coupled with a mechanical field and an electric field of the second beam unit on two opposite sides along the second axis; wherein the first in-surface transducer is fixed to the base and spaced from the second beam unit;
a first out-surface transducer formed by at least one of two opposite sides of the second beam unit along a third axis coupled with the mechanical field and electric field of the second beam unit; the first out-surface transducer is fixed to the base and spaced from the second beam unit;
wherein, N and M are positive integers not less than 2; the first axis, the second axis and the third axis are perpendicular to each other; the MEMS wave gyroscope has a driving mode and a detection mode the driving mode comprises an in-plane wave mode in a plane of the volatility structure and an out-of-plane wave mode in the plane of the volatility structure; and the detection mode comprises a first axis detection mode with the first axis as a detection axis.

2. The MEMS wave gyroscope as described in claim 1, wherein, in the driving mode, the first beam unit and the second beam unit work in a second-order mode, and the M−1 first beam units move in the same phase or anti-phase; the N−1 second beam units move in the same phase or anti-phase; in the first axis detection mode, the second beam unit works in a second-order mode; and the N−1 second beam units move in the same phase or in anti-phase.

3. The MEMS wave gyroscope as described in claim 1, wherein the second beam unit is fixedly provided with a first weight along two opposite sides of the second axis, and the first weight and the first in-surface transducer are arranged at intervals.

4. The MEMS wave gyroscope as described in claim 1, wherein the detection mode further comprises a second axis detection mode with the second axis as the detection axis, and the MEMS wave gyroscope further comprises:
   a second in-surface transducer provided by the first beam unit coupled with a mechanical field and an electric field of the first beam unit along both sides of the first axis; wherein the second in-surface transducer is fixed to the base and spaced from the first beam unit;
   a second out-surface transducer provided by at least one of two opposite sides of the first beam unit along the third axis coupled with the mechanical field and electric field of the first beam unit; wherein the second out-surface transducer is fixed to the base and spaced from the first beam unit.

5. The MEMS wave gyroscope as described in claim 4, wherein in the second axis detection mode, the first beam unit works in a second-order mode, and the M−1 first beam units move in the same phase or anti-phase.

6. The MEMS wave gyroscope as described in claim 4, wherein the first beam unit is respectively fixedly provided with a second weight along two opposite sides of the first axis; and the second weight and the second in-surface transducer are set at intervals.

7. The MEMS wave gyroscope as described in claim 4, wherein the first beam unit and the second beam unit have a same length.

8. The MEMS wave gyroscope as described in claim 1, wherein a length of the first beam unit is not equal to a length of the second beam unit.

9. The MEMS wave gyroscope as described in claim 1, wherein the anchor structure locates on a periphery of the volatility structure; a coupling beam is connected between the node located on the outer contour of the volatility structure and the anchor structure.

10. The MEMS wave gyroscope as described in claim 9, wherein the anchor structure comprises multiple anchor points; one end of the coupling beam is connected to the anchor point, and the other end is connected to the node located on the outer contour of the volatility structure.

* * * * *